(12) United States Patent
Yamasaki et al.

(10) Patent No.: US 12,185,193 B2
(45) Date of Patent: Dec. 31, 2024

(54) COMMUNICATION DEVICE, COMMUNICATION SYSTEM, AND COMMUNICATION METHOD

(71) Applicant: Panasonic Intellectual Property Management Co., Ltd., Osaka (JP)

(72) Inventors: Akira Yamasaki, Osaka (JP); Kazuki Hashimoto, Osaka (JP); Nobuhiko Arashin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 268 days.

(21) Appl. No.: 17/690,499

(22) Filed: Mar. 9, 2022

(65) Prior Publication Data

US 2022/0295234 A1    Sep. 15, 2022

(30) Foreign Application Priority Data

Mar. 12, 2021 (JP) ................................ 2021-040547

(51) Int. Cl.
*H04W 4/06* (2009.01)
*H04L 5/00* (2006.01)
(Continued)

(52) U.S. Cl.
CPC ............. *H04W 4/06* (2013.01); *H04L 5/0055* (2013.01); *H04L 61/5069* (2022.05); *H04L 12/189* (2013.01)

(58) Field of Classification Search
CPC . H04L 27/2601; H04L 12/189; H04L 5/0055; H04L 12/1886; H04L 5/0042;
(Continued)

(56) References Cited

U.S. PATENT DOCUMENTS

2003/0233540 A1* 12/2003 Banerjee ............. H04L 63/0428
   713/153
2007/0115973 A1* 5/2007 Koga ....................... H04B 3/54
   370/466
(Continued)

FOREIGN PATENT DOCUMENTS

JP     2017-28334     2/2017
JP    2017-130744     7/2017
(Continued)

*Primary Examiner* — Nathan S Taylor
(74) *Attorney, Agent, or Firm* — Wenderoth, Lind & Ponack, L.L.P.

(57) ABSTRACT

A communication device for performing wireless communication with another communication device, includes a wired communication interface configured to be connected to a wired communication line, a wireless communication interface configured to be connected to the other communication device by wireless communication, an antenna configured to transmit or receive a wireless signal related to the wireless communication, and a processor configured to, in a case that a destination of a first frame received by the wired communication interface indicates a broadcast address or a multicast address, wirelessly transmit a second frame to the other communication device with a modulation scheme and a coding rate set according to a wireless communication environment with the other communication device. The second frame includes the first frame and the second frame has a unicast address indicating a destination of the other communication device.

11 Claims, 6 Drawing Sheets

(51) Int. Cl.
*H04L 61/5069* (2022.01)
*H04L 12/18* (2006.01)

(58) Field of Classification Search
CPC .. H04L 61/5069; H04L 5/00; H04W 28/0268; H04W 28/10; H04W 76/10; H04W 80/02; H04W 76/12; H04W 28/02; H04W 80/10; H04W 76/20; H04W 4/40; H04W 4/46; H04W 4/44; H04W 40/22; H04W 40/248; H04W 40/24; H04W 4/06; H04W 16/28; H04W 28/04; H04W 28/18; B60W 60/001; B60W 60/00; G05D 1/02; G01S 5/14; G01S 5/06
See application file for complete search history.

(56) References Cited

U.S. PATENT DOCUMENTS

| | | | | |
|---|---|---|---|---|
| 2007/0168523 A1* | 7/2007 | Jiang | ........... | H04L 65/1101 709/228 |
| 2007/0168555 A1* | 7/2007 | Dorenbosch | ........ | H04L 65/611 709/245 |
| 2008/0089263 A1* | 4/2008 | Tsutsumi | ........ | H04W 52/0216 370/312 |
| 2008/0232373 A1* | 9/2008 | Iyer | ........ | H04L 12/189 370/465 |
| 2008/0247373 A1* | 10/2008 | Synnergren | ........... | H04W 4/10 370/340 |
| 2013/0070765 A1* | 3/2013 | Chapman | ........... | H04N 21/2221 370/390 |
| 2015/0201312 A1* | 7/2015 | Tjahjono | ........ | H04L 45/16 370/312 |
| 2015/0201323 A1* | 7/2015 | Tjahjono | ........ | H04L 12/185 370/312 |
| 2016/0021597 A1* | 1/2016 | Hart | ........ | H04L 45/74 370/329 |
| 2017/0034847 A1* | 2/2017 | He | ........ | H04W 74/06 |
| 2017/0208480 A1 | 7/2017 | Takahashi et al. | | |
| 2018/0338265 A1* | 11/2018 | Goel | ........ | H04L 45/02 |
| 2020/0259896 A1* | 8/2020 | Sachs | ........ | H04W 12/06 |
| 2020/0367062 A1* | 11/2020 | Salahuddeen | ........ | H04W 16/14 |
| 2021/0119815 A1* | 4/2021 | Liu | ........ | H04L 12/66 |
| 2021/0234717 A1* | 7/2021 | Speicher | ........ | H04W 72/30 |
| 2021/0258739 A1* | 8/2021 | Murakami | ........ | H04W 72/0453 |

FOREIGN PATENT DOCUMENTS

| | | | | |
|---|---|---|---|---|
| JP | 2020-167590 | | 10/2020 | |
| WO | WO-2021158665 A1 * | | 8/2021 | ......... H04L 27/2666 |

* cited by examiner

COMMUNICATION DEVICE, COMMUNICATION SYSTEM, AND COMMUNICATION METHOD

CROSS-REFERENCE TO RELATED APPLICATIONS

This application is based on and claims priority under 35 USC 119 from Japanese Patent Application No. 2021-040547 filed on Mar. 12, 2021, the contents of which are incorporated herein by reference.

TECHNICAL FIELD

The present disclosure relates to a communication device, a communication system, and a communication method.

BACKGROUND ART

A backhaul system connecting a base station and a core network is constituted by connecting a plurality of disposed communication devices in multiple stages in a wired or wireless manner as described in JP-A-2017-28334. In the backhaul system, a communication device may transfer a frame (data) received from a preceding-stage communication device to a subsequent-stage communication device to be wirelessly connected. When a destination of the frame received from the preceding-stage communication device is a broadcast address or a multicast address, the communication device wirelessly transmits the frame to the subsequent-stage communication device by broadcast or multicast.

SUMMARY OF INVENTION

An object of the present disclosure is to provide a technique for improving data transmission efficiency of broadcast or multicast wireless transmission.

An aspect of non-limiting embodiments of the present disclosure relates to provide a communication device for performing wireless communication with another communication device, the communication device including:

a wired communication interface configured to be connected to a wired communication line;

a wireless communication interface configured to be connected to the other communication device by wireless communication;

an antenna configured to transmit or receive a wireless signal related to the wireless communication; and a processor configured to, in a case that a destination of a first frame received by the wired communication interface indicates a broadcast address or a multicast address, wirelessly transmit a second frame to the other communication device with a modulation scheme and a coding rate set according to a wireless communication environment with the other communication device, in which the second frame includes the first frame and the second frame has a unicast address indicating a destination of the other communication device.

Another aspect of non-limiting embodiments of the present disclosure relates to provide a communication system for performing wireless communication between a first communication device and a second communication device, in which in a case that a destination of a first frame received from a first communication line indicates a broadcast address or a multicast address, the first communication device wirelessly transmits a second frame to the second communication device with a modulation scheme and a coding rate set according to a wireless communication environment with the second communication device, the second frame includes the first frame and the second frame has a unicast address indicating a destination of the second communication device, and the second communication device receives the second frame from the first communication device, and transmits the first frame included in the second frame to a second communication line.

A further another aspect of non-limiting embodiments of the present disclosure relates to provide a communication method for performing wireless communication between a first communication device and a second communication device, in which in a case that a destination of a first frame received from a first communication line indicates a broadcast address or a multicast address, the first communication device wirelessly transmits a second frame to the second communication device with a modulation scheme and a coding rate set according to a wireless communication environment with the second communication device, the second frame includes the first frame and the second frame has a unicast address indicating a destination of the second communication device, and the second communication device receives the second frame from the first communication device, and transmits the first frame included in the second frame to a second communication line.

These comprehensive or specific aspects may be implemented by a system, a device, a method, an integrated circuit, a computer program, or a recording medium, or may be implemented by any combination of the system, the device, the method, the integrated circuit, the computer program, and the recording medium.

According to the present disclosure, it is possible to improve data transmission efficiency of broadcast or multicast wireless transmission.

DESCRIPTION OF EMBODIMENTS

Hereinafter, embodiments of the present disclosure will be described in detail with reference to the drawings as appropriate. However, unnecessarily detailed description may be omitted. For example, detailed description of well-known matters and redundant description of substantially the same configuration may be omitted. This is to avoid unnecessary redundancy of the following description and to facilitate understanding of those skilled in the art. The accompanying drawings and the following description are provided for those skilled in the art to fully understand the present disclosure, and are not intended to limit the subject matter described in the claims.

In the following description, when components are distinguished from each other, reference signs in which alphanumeric characters are added after numerals are used, for example, STAs 20A and 20B. When the components are not distinguished from each other, numerical reference signs are used, for example, a STA 20.

Embodiments

Configuration of Communication System

Figure 1:
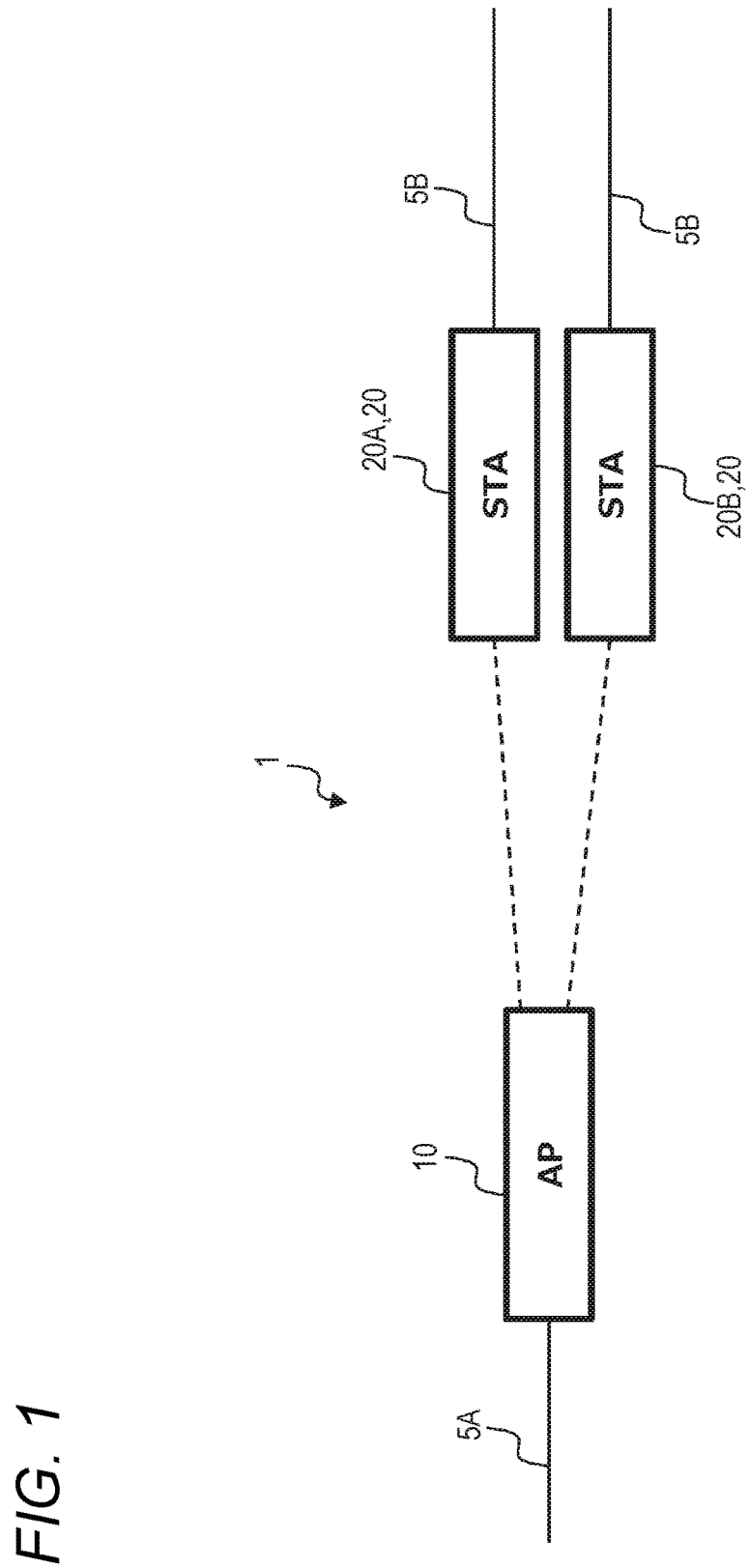
FIG. 1 is a block diagram showing a configuration example of a communication system according to the present embodiment.

FIG. 1 is a block diagram showing a configuration example of a communication system 1 according to the present embodiment.

The communication system 1 includes, for example, an access point (AP) 10, a station (STA) 20A, and a STA 20B. The AP 10 and a STA 20 may be read as communication devices. The AP 10 may be read as a first communication device, and the STA 20 may be read as a second communication device. Conversely, the AP 10 may be read as the second communication device, and the STA 20 may be read as the first communication device. The AP 10 and the STA 20 may be similar communication devices, or may be communication devices that are partially different from each other.

The AP 10 is connected to a first communication line 5A. The first communication line 5A may be a wired communication line represented by Ethernet. The STA 20 is connected to a second communication line 5B. The second communication line 5B may be a wired communication line represented by Ethernet. When the communication system 1 constitutes a wired or wireless backhaul system or constitutes a wireless distribution system (WDS), the AP 10 may be connected to a preceding-stage communication device (not shown) through the first communication line 5A, and the STA 20 may be connected to a subsequent-stage communication device (not shown) through the second communication line 5B.

The STA 20A and the STA 20B are wirelessly connected to the AP 10 by wireless communication. A wireless signal in a 60 GHz band, which is an example of a millimeter wave band, may be used for the wireless communication. This enables high-speed wireless communication. A frequency band used for wireless communication is not limited to the millimeter wave band, and may be any frequency band. However, the present disclosure is more suitable for solving problems that occur when the frequency band used for the wireless communication is the millimeter wave band. The number of STA 20 wirelessly connected to the AP 10 is not limited to two, and may be one or three or more.

The AP 10 wirelessly transfers a frame (data) received from the first communication line 5A to the STA 20 indicated by a destination of the frame as necessary. Hereinafter, the frame received from the first communication line 5A is referred to as an Ethernet frame or a first frame. A destination of the Ethernet frame may be indicated by a MAC address. The STA 20 may transfer the Ethernet frame received from the AP 10 by wireless communication to the second communication line 5B as necessary.

In the related art, in a case that the destination of the Ethernet frame received from the first communication line 5A indicates a broadcast address or a multicast address, the AP 10 generates a frame for wireless communication in which the destination is the broadcast address or the multicast address, and transmits the frame to the STA 20 by a wireless signal including the frame. Hereinafter, the frame for wireless communication is referred to as a wireless frame or a second frame. In this case, the AP 10 transmits the wireless frame by a wireless signal of a modulation and coding scheme (MCS) 0 so that the wireless frame reaches all the STAs 20 as reliably as possible. The MCS is obtained by indexing a combination of a modulation scheme, a coding rate, and the like, and the larger the value, the higher the data transmission efficiency. The MCS may be determined in advance as a specification.

In contrast, in the communication system 1 according to the present embodiment, in a case that the destination of the Ethernet frame received from the first communication line 5A indicates the broadcast address or the multicast address, the AP 10 wirelessly transfers the Ethernet frame to each STA 20 by a unicast wireless frame. Accordingly, a MCS larger than 0 can also be used, and the data transmission efficiency can be improved. Details will be described below. In the following, a case where a destination of a received Ethernet frame is a broadcast address will be described, but the following description is also applicable to a case where the destination of the received Ethernet frame is a multicast address. That is, the broadcast address in the following description can be read as a multicast address as appropriate.

Configuration of AP

Figure 2:
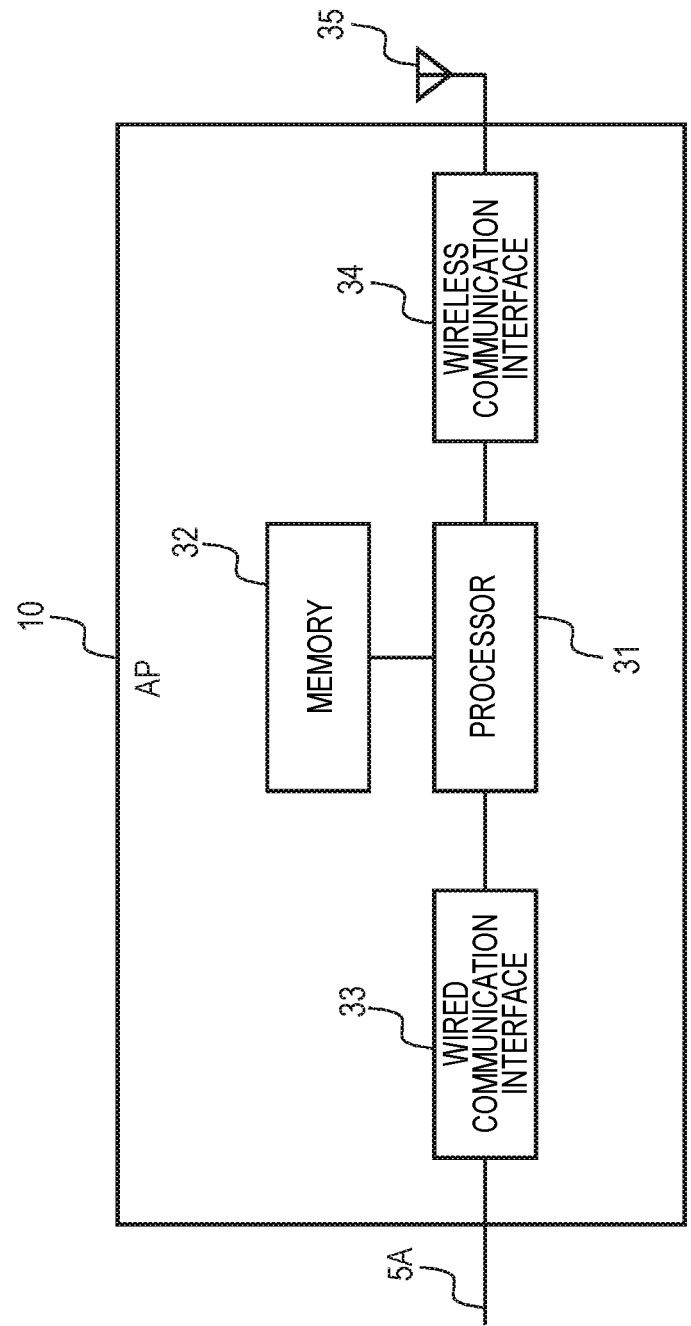
FIG. 2 is a block diagram illustrating an example of a configuration of an AP according to the present embodiment.

FIG. 2 is a block diagram showing an example of a configuration of the AP 10 according to the present embodiment. However, the description of FIG. 2 is also applicable to the STA 20. In a case that the description of FIG. 2 is applicable to the STA 20, the AP 10 may be read as the STA 20, the STA 20 may be read as the AP 10, and the first communication line 5A may be read as the second communication line 5B.

The AP 10 includes a processor 31, a memory 32, a wired communication interface 33, a wireless communication interface 34, and an antenna 35.

The antenna 35 transmits and receives a wireless signal. The antenna 35 supports beam forming, and may set a direction of directivity.

The wireless communication interface 34 modulates data input from the processor 31 to generate a wireless signal, and outputs the wireless signal to the antenna 35. The wireless signal received by the antenna 35 is input to the wireless communication interface 34. The wireless communication interface 34 demodulates the input wireless signal and outputs the demodulated signal to the processor 31. The wireless communication interface 34 may be a communication interface corresponding to IEEE 802.11ad (WiGig). However, the wireless communication interface 34 may be a communication interface corresponding to another wireless communication standard (IEEE 802.11b/g/n/ac or the like) or a mobile communication standard (Long Term Evolution (LTE), 4G, 5G or the like).

The wired communication interface 33 demodulates a signal input from the first communication line 5A and outputs the demodulated signal to the processor 31. The wired communication interface 33 modulates data input from the processor 31 to generate a signal, and outputs the signal to the first communication line 5A. The wired communication interface 33 may be, for example, a communication interface corresponding to Ethernet. However, the wired communication interface 33 may be a communication interface corresponding to another wired communication standard.

The memory 32 stores data read and written from and to the processor 31. The memory 32 may include, for example, a read-only memory (ROM) and a random access memory (RAM). In addition, the memory 32 may include a flash memory which is an example of a nonvolatile storage medium.

The processor 31 executes various processes in cooperation with the memory 32 and implements an operation of the AP 10 (or STA 20) described in the present embodiment. Details of the processes executed by the processor 31 will be described later.

Operation Example of AP

Figure 3:
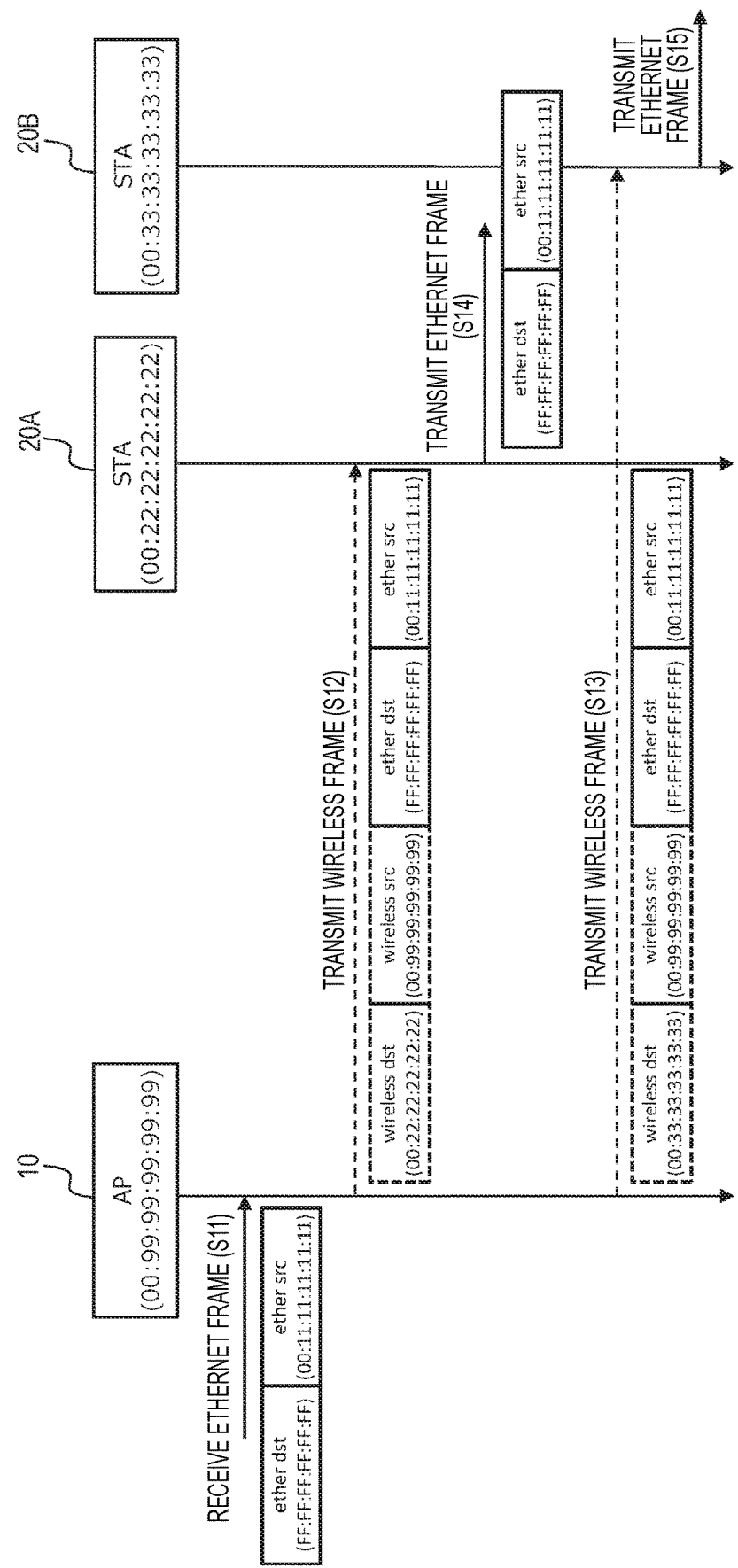
FIG. 3 is a sequence diagram showing an example in which an AP receiving an Ethernet frame of a broadcast address wirelessly transmits the Ethernet frame to a STA by a wireless frame of a unicast address.

FIG. 3 is a sequence diagram showing an example in which the AP 10 that has received an Ethernet frame of a broadcast address (or a multicast address, ditto hereinafter) wirelessly transmits the Ethernet frame to the STA 20A and the STA 20B by a wireless frame of a unicast address.

Here, it is assumed that a MAC address of the AP 10 is "00: 99: 99: 99: 99: 99", a MAC address of the STA 20A is "00: 22: 22: 22: 22: 22", and a MAC address of the STA 20B is "00: 33: 33: 33: 33: 33".

In FIG. 3, the destination of the Ethernet frame is denoted as "ether dst", a source of the Ethernet frame is denoted as "ether src", a destination of the wireless frame is denoted as "wireless dst", and a source of the wireless frame is denoted as "wireless src". This also applies to FIG. 4 described later.

In a case that the AP 10 receives an Ethernet frame whose destination is the broadcast address "FF: FF: FF: FF: FF: FF" from the first communication line 5A (S11), the AP 10 performs the following process.

The AP 10 generates a wireless frame including the received Ethernet frame and to which a unicast address "00: 22: 22: 22: 22: 22" of the STA 20A is added, and transmits a wireless signal including the wireless frame to the STA 20A (S12). At this time, the AP 10 may set a MCS of the wireless signal in accordance with a wireless communication environment with the STA 20A. For example, the AP 10 may set one or more MCSs. In addition, the AP 10 may set beam forming (directivity) for the STA 20A and transmit the wireless signal.

Next, the AP 10 generates a wireless frame including the received Ethernet frame and to which a unicast address "00: 33: 33: 33: 33: 33" of the STA 20B is added, and transmits a wireless signal including the wireless frame to the STA 20B (S13). At this time, the AP 10 may set a MCS of the wireless signal in accordance with a wireless communication environment with the STA 20B. For example, the AP 10 may set one or more MCSs. In addition, the AP 10 may set beam forming (directivity) for the STA 20B and transmit the wireless signal.

The STA 20A receives the wireless frame from the AP 10 and checks the destination of the Ethernet frame included in the wireless frame. In a case of FIG. 3, since the destination of the Ethernet frame is the broadcast address, the STA 20A transmits the Ethernet frame to the second communication line 5B by broadcast (S14).

Even when the destination of the received wireless frame is a unicast address and the destination of the Ethernet frame included in the wireless frame is broadcast, the STA 20A does not need to transmit an acknowledgement (ACK) for the wireless frame to the AP 10.

Even when the destination of the transmitted wireless frame is a unicast address and the destination of the Ethernet frame included in the wireless frame is broadcast, the AP 10 may operate as follows. That is, even when the AP 10 does not receive the ACK for the wireless frame from the STA 20A, the AP 10 does not need to retransmit the wireless frame.

Accordingly, since ACK transmission and wireless frame retransmission are not performed, wireless resources can be efficiently used.

The STA 20B receiving the wireless frame from the AP 10 may also perform the same process as that of the STA 20A described above (S15).

Operation Example of STA

Figure 4:
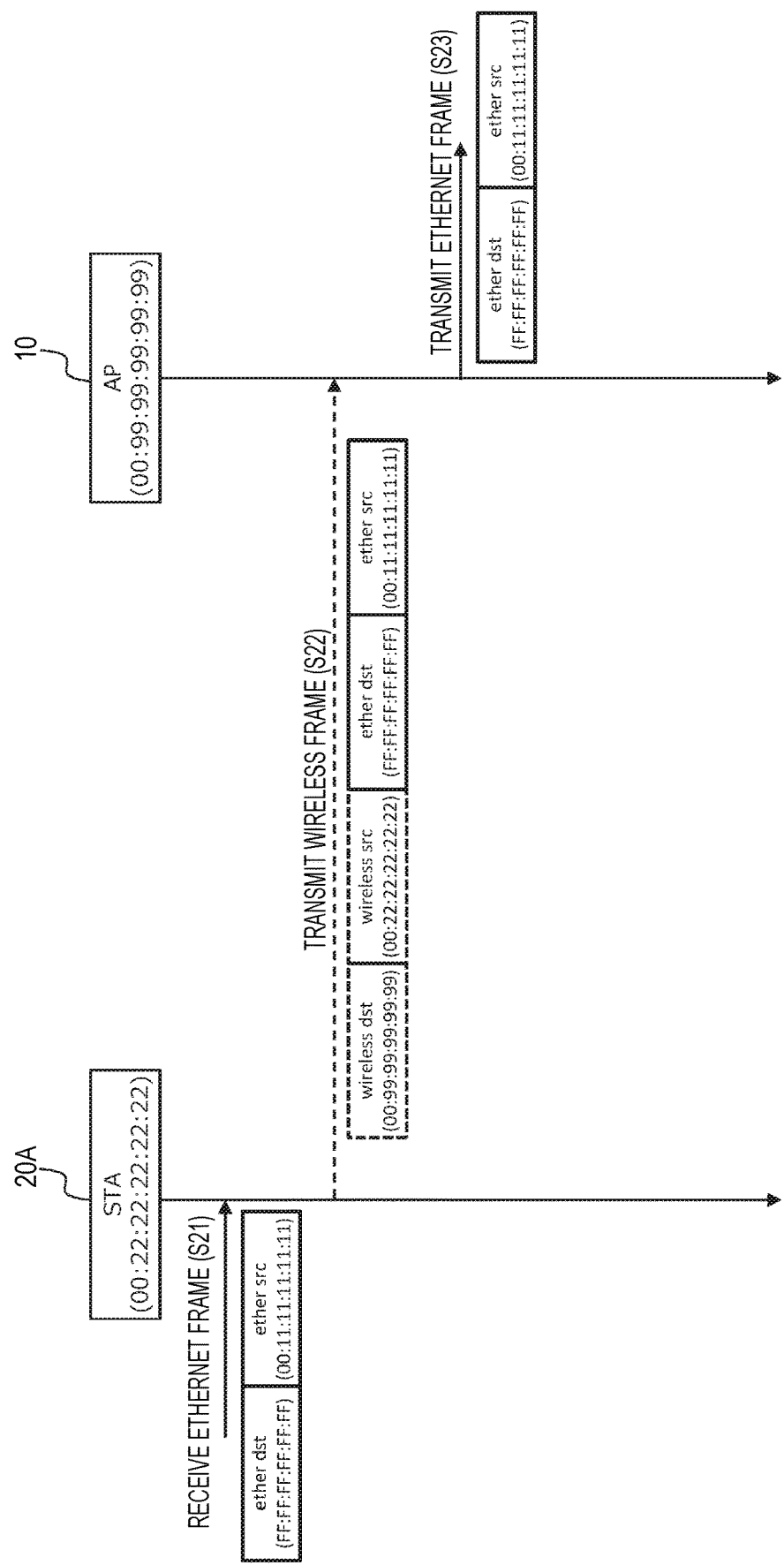
FIG. 4 is a sequence diagram showing an example in which a STA receiving the Ethernet frame of the broadcast address wirelessly transmits the Ethernet frame to the AP by the wireless frame of the unicast address.

FIG. 4 is a sequence diagram showing an example in which the STA 20A receiving the Ethernet frame of the broadcast address wirelessly transmits the Ethernet frame to the AP 10 by the wireless frame of the unicast address.

In a case that the STA 20A receives the Ethernet frame whose destination is the broadcast address "FF: FF: FF: FF: FF: FF" from the second communication line 5B (S21), the STA 20A performs the following process.

The STA 20A generates a wireless frame in which a unicast address "00: 99: 99: 99: 99: 99" of the AP 10 is added to the received Ethernet frame, and transmits a wireless signal including the wireless frame to the AP 10 (S22). At this time, the STA 20A may set a MCS of the wireless signal in accordance with a wireless communication environment with the AP 10. For example, the STA 20A may set one or more MCSs. In addition, the STA 20A may set beam forming (directivity) for the AP 10 and transmit the wireless signal.

The AP 10 receives the wireless frame from the STA 20A and checks the destination of the Ethernet frame included in the wireless frame. In a case of FIG. 4, since the destination of the Ethernet frame is the broadcast address, the AP 10 transmits the Ethernet frame to the first communication line 5A by broadcast (S23).

Even when the destination of the received wireless frame is a unicast address and the destination of the Ethernet frame included in the wireless frame is broadcast, the AP 10 does not need to transmit the ACK for the received wireless frame to the STA 20A.

Even when the destination of the transmitted wireless frame is a unicast address and the destination of the Ethernet frame included in the wireless frame is broadcast, the STA 20A may operate as follows. That is, even when the STA 20A does not receive the ACK for the wireless frame from the AP 10, the STA 20A does not need to retransmit the wireless frame.

AP Flowchart

Figure 5:
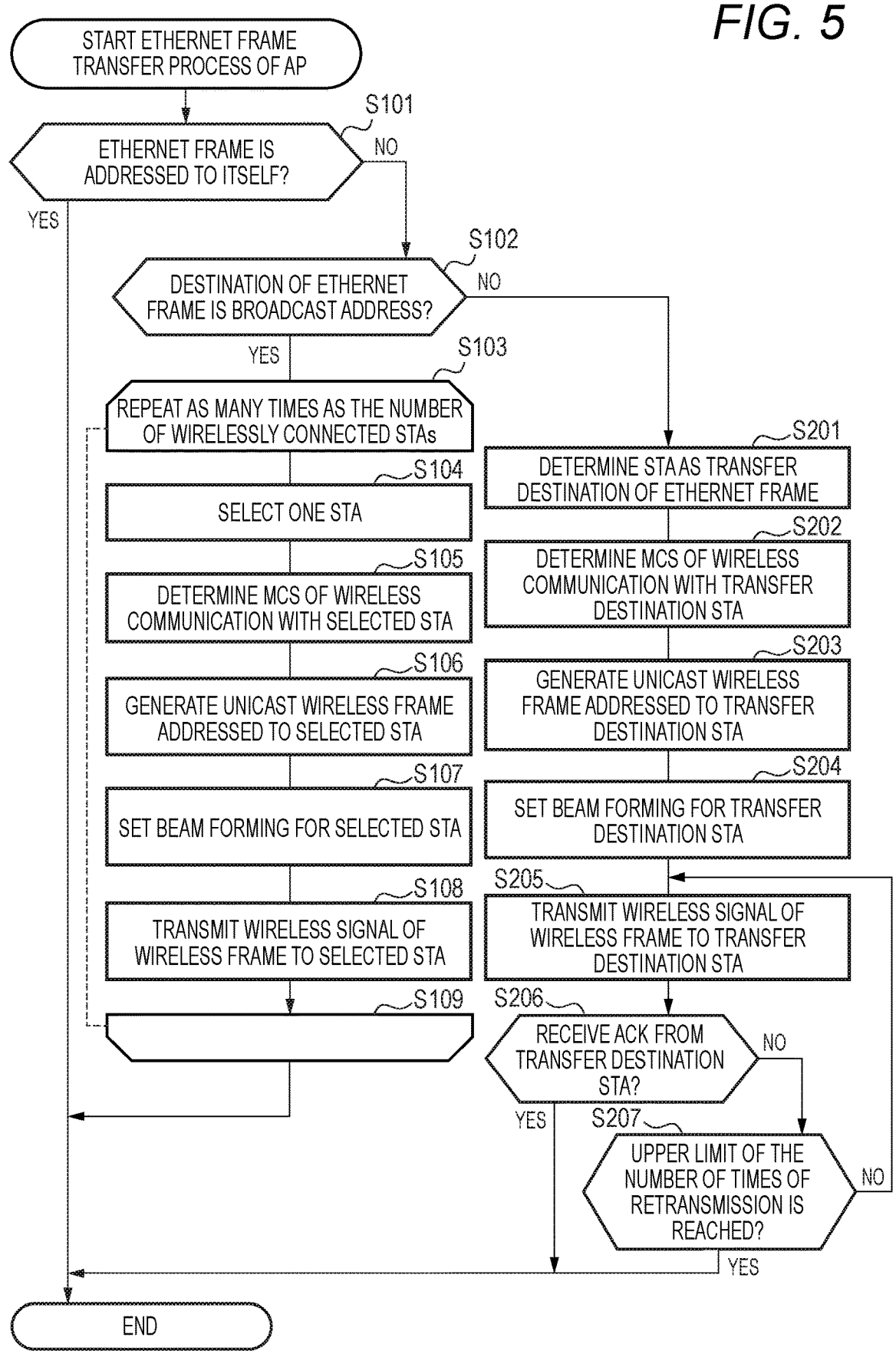
FIG. 5 is a flowchart showing an example of a process in which the AP transfers the Ethernet frame.

FIG. 5 is a flowchart showing an example of a process in which the AP 10 transfers the Ethernet frame. Regarding a process in which the STA 20 transfers an Ethernet frame, the AP 10 may be read as the STA 20 and the STA 20 may be read as the AP 10 in the description of FIG. 5.

In S101, the processor 31 of the AP 10 determines whether the Ethernet frame received by the wired communication interface 33 is addressed to itself.

If the received Ethernet frame is addressed to itself (S101: YES), the processor 31 of the AP 10 receives the Ethernet frame and ends the process. This is because it is not necessary to transfer the received Ethernet frame to the wirelessly connected STAs 20.

If the received Ethernet frame is not addressed to itself (S101: NO), in S102, the processor 31 of the AP 10 determines whether the destination of the Ethernet Frame is a broadcast address.

Next, a case where it is determined that the destination of the received Ethernet frame is a broadcast address (S102: YES) will be described.

In S103, the processor 31 of the AP 10 repeats S103 to S109 as many times as the number of STAs 20 wirelessly connected to the wireless communication interface 34.

In S104, the processor 31 of the AP 10 selects one STA 20 that has not yet been selected among the wirelessly connected STAs 20. Hereinafter, the selected STA 20 is referred to as a selected STA 20.

In S105, the processor 31 of the AP 10 determines a MCS based on a wireless communication state with the selected STA 20. For example, the processor 31 of the AP 10 sets a relatively large MCS for the selected STA 20 at a short distance. Accordingly, it is possible to transmit the wireless frame more efficiently than setting the MCS 0 to transmit the wireless frame of the broadcast address. In addition, the processor 31 of the AP10 can make the wireless frame including the Ethernet frame of the broadcast address reach the STA20 faster and more reliably for each of the plurality of wirelessly connected STA20s.

In S106, the processor 31 of the AP 10 generates a unicast wireless frame including the received Ethernet frame and addressed to the selected STA 20.

In S107, the processor 31 of the AP 10 controls the wireless communication interface 34 and the antenna 35 to set beam forming (directivity) for the selected STA 20. Since the millimeter wave band used for wireless communication has high straightness, the wireless frame including the Ethernet frame of the broadcast address can reach the STA 20 faster and more reliably by setting the directivity of the wireless signal for the selected STA 20 in this manner.

In S108, the processor 31 of the AP 10 controls the wireless communication interface 34 and the antenna 35 to transmit the unicast wireless frame addressed to the selected STA 20 as a wireless signal of the MCS determined in S105.

In S109, the processor 31 of the AP 10 repeats S103 to S109 as many times as the number of STAs 20 wirelessly connected to the wireless communication interface 34, and then ends the process.

Next, a case where it is determined that the destination of the received Ethernet frame is not broadcast (S102: NO) will be described.

In S201, the processor 31 of the AP 10 refers to a MAC address table in the wireless communication interface 34 and determines a STA 20 as a transfer destination of the Ethernet frame among the wirelessly connected STAs 20. Hereinafter, the determined STA 20 is referred to as a transfer destination STA 20.

In S202, the processor 31 of the AP 10 determines a MCS based on a wireless communication state with the transfer destination STA 20.

In S203, the processor 31 of the AP 10 generates a unicast wireless frame including the received Ethernet frame and addressed to the transfer destination STA 20.

In S204, the processor 31 of the AP 10 controls the wireless communication interface 34 and the antenna 35 to set beam forming (directivity) for the transfer destination STA 20.

In S205, the processor 31 of the AP 10 controls the wireless communication interface 34 and the antenna 35 to transmit the unicast wireless frame addressed to the transfer destination STA 20 as a wireless signal of the MCS determined in S202.

In S206, the processor 31 of the AP 10 determines whether the ACK is received from the transfer destination STA 20 within a predetermined period.

If the ACK is received from the transfer destination STA 20 within the predetermined period (S206: YES), the processor 31 of the AP 10 ends the process.

If the ACK is not received from the transfer destination STA 20 within the predetermined period (S206: NO), in S27, the processor 31 of the AP 10 determines whether an upper limit of the number of times of retransmission of the wireless frame is reached.

If the upper limit of the number of times of retransmission of the wireless frame is reached (S207: YES), the processor 31 of the AP 10 ends the process. In this case, the transfer of the received Ethernet frame to the transfer destination STA20 fails.

If the upper limit of the number of retransmission of the wireless frame is not reached (S207: NO), the processor 31 of the AP 10 returns to the process of S205 and retransmits the wireless frame.

STA Flowchart

Figure 6:
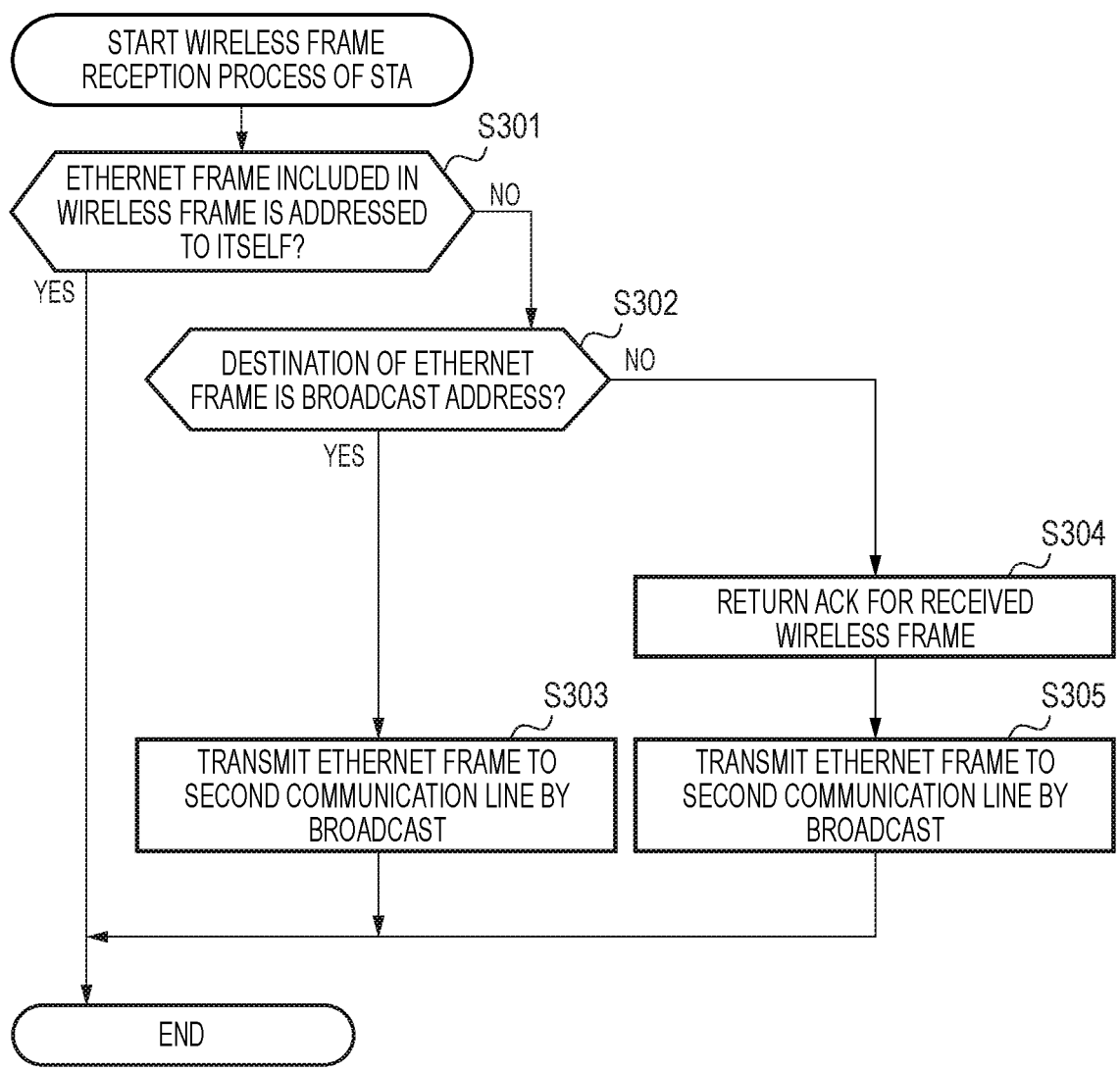
FIG. 6 is a flowchart showing an example of a process in which the STA receives the wireless frame.

FIG. 6 is a flowchart showing an example of a process in which the STA 20 receives the wireless frame. Regarding a process in which the AP 10 receives a wireless frame, the STA 20 may be read as the AP 10, and the AP 10 may be read as the STA 20 in the description of FIG. 6.

In S301, the processor 31 of the STA 20 determines whether the Ethernet frame included in the wireless frame received by the wireless communication interface 34 is addressed to the STA 20.

If the Ethernet frame is addressed to itself (S301: YES), the processor 31 of the STA 20 receives the Ethernet frame and ends the process.

If it is determined that the Ethernet frame is not addressed to itself (S301: NO), in S302, the processor 31 of the STA 20 determines whether the destination of the Ethernet frame is a broadcast address.

If the destination of the Ethernet frame is a broadcast address (S302: YES), the processor 31 of the STA 20 performs S303.

In S303, the processor 31 of the STA 20 controls the wired communication interface 33 to transmit the received Ethernet frame to the second communication line 5B by broadcast, and ends the process. At this time, the processor 31 of the STA 20 does not need to return the ACK for the wireless frame received from the AP 10 to the AP 10. Accordingly, it is possible to efficiently use the wireless resources.

If the destination of the Ethernet frame is not broadcast (S302: NO), the processor 31 of the STA 20 performs S304.

In S304, the processor 31 of the STA 20 returns the ACK for the wireless frame received from the AP 10 to the AP 10.

In S305, the processor 31 of the STA 20 controls the wired communication interface 33 to transmit the received Ethernet frame to the second communication line 5B by broadcast, and ends the process.

Although the embodiments have been described with reference to the accompanying drawings, the present disclosure is not limited thereto. It will be apparent to those skilled in the art that various modifications, corrections, substitutions, additions, deletions, and equivalents can be conceived within the scope described in the claims, and it is to be understood that such modifications, corrections, substitutions, additions, deletions, and equivalents also fall within the technical scope of the present disclosure. Components in the above embodiments may be optionally combined within a range not departing from the spirit of the invention.

The technique of the present disclosure is useful for a communication device capable of a broadcast or multicast wireless communication.

What is claimed is:

1. A communication device for performing wireless communication with another communication device, the communication device comprising:
   a wired communication interface configured to be connected to a wired communication line;
   a wireless communication interface configured to be connected to the other communication device by wireless communication;
   an antenna configured to transmit or receive a wireless signal related to the wireless communication; and
   a processor configured to, when a destination of a first frame received by the wired communication interface indicates a broadcast address or a multicast address, wirelessly transmit a second frame to the other communication device with a modulation scheme and a coding rate set according to a wireless communication environment with the other communication device,
   wherein the second frame includes the first frame and the second frame has a unicast address indicating a destination of the other communication device, and
   wherein the processor processes to wirelessly transmit the second frame with a directivity set for the other communication device.

2. The communication device according to claim 1, wherein
   when a plurality of other communication devices are connected to the wireless communication interface, the processor processes to wirelessly transmit the second frame to each of the other communication devices with the modulation scheme, coding rate, and directivity set for each of the plurality of other communication devices.

3. The communication device according to claim 1, wherein
   the processor does not retransmit the second frame even when the processor does not receive an acknowledgement from the other communication device after transmitting the second frame.

4. A communication system for performing wireless communication between a first communication device and a second communication device, the communication system comprising the first communication device and the second communication device, wherein
   when a destination of a first frame received from a first communication line indicates a broadcast address or a multicast address, the first communication device wirelessly transmits a second frame to the second communication device with a modulation scheme and a coding rate set according to a wireless communication environment with the second communication device,
   the second frame includes the first frame and the second frame has a unicast address indicating a destination of the second communication device,
   the second communication device receives the second frame from the first communication device, and transmits the first frame included in the second frame to a second communication line, and
   the first communication device wirelessly transmits the second frame with a directivity set for the second communication device.

5. The communication system according to claim 4, wherein
   when a plurality of second communication devices are connected to the first communication device, the first communication device wirelessly transmits the second frame to each of the second communication devices with the modulation scheme, coding rate, and directivity set for each of the plurality of second communication devices.

6. The communication system according to claim 4, wherein
   the first communication device does not retransmit the second frame even when the first communication device does not receive an acknowledgement from the second communication device after transmitting the second frame.

7. The communication system according to claim 4, wherein
   the second communication device receives the second frame from the first communication device, and does not transmit an acknowledgment to the second frame to the first communication device when a destination of the first frame included in the second frame indicates a broadcast address or a multicast address.

8. A communication method for performing wireless communication between a first communication device and a second communication device, the communication method comprising:
   when a destination of a first frame received from a first communication line indicates a broadcast address or a multicast address, wirelessly transmitting with the first communication device a second frame to the second communication device with a modulation scheme and a coding rate set according to a wireless communication environment with the second communication device, the second frame including the first frame and the second frame having a unicast address indicating a destination of the second communication device; and
   receiving with the second communication device the second frame from the first communication device, and transmitting with the second communication device the first frame included in the second frame to a second communication line,
   wherein the first communication device wirelessly transmits the second frame with a directivity set for the second communication device.

9. The communication method according to claim 8, wherein
   when a plurality of second communication devices are connected to the first communication device, the first communication device wirelessly transmits the second frame to each of the second communication devices with the modulation scheme, coding rate, and directivity set for each of the plurality of second communication devices.

10. The communication method according to claim 8, wherein
    the first communication device does not retransmit the second frame even when the first communication device does not receive an acknowledgement from the second communication device after transmitting the second frame.

11. The communication method according to claim 8, wherein
the second communication device receives the second frame from the first communication device, and does not transmit an acknowledgment to the second frame to the first communication device when a destination of the first frame included in the second frame indicates a broadcast address or a multicast address.

\* \* \* \* \*